(12) United States Patent
Benetti et al.

(10) Patent No.: US 7,806,112 B2
(45) Date of Patent: Oct. 5, 2010

(54) APPARATUS FOR LAUNCHING BALLS FOR SPORTS PRACTICE

(75) Inventors: Alfredo Benetti, Via Berti, 29, Piacenza (IT) I-29100; Claudio Benetti, Via Triest, 64, Verona (IT) I-37135; Antonio Meneghini, Via Lucania, 12, Verona (IT) I-37138

(73) Assignees: Alfredo Benetti, Piacenza (IT); Claudio Benetti, Verona (IT); Antonio Meneghini, Verona (IT)

( * ) Notice: Subject to any disclaimer, the term of this patent is extended or adjusted under 35 U.S.C. 154(b) by 1127 days.

(21) Appl. No.: 10/585,137

(22) PCT Filed: Dec. 30, 2003

(86) PCT No.: PCT/IT03/00864

§ 371 (c)(1),
(2), (4) Date: Jun. 30, 2006

(87) PCT Pub. No.: WO2005/063344

PCT Pub. Date: Jul. 14, 2005

(65) Prior Publication Data

US 2007/0157915 A1      Jul. 12, 2007

(51) Int. Cl.
*F41B 11/00* (2006.01)
(52) U.S. Cl. ..................................... 124/70
(58) Field of Classification Search ............. 124/69–77; 89/7
See application file for complete search history.

(56) References Cited

U.S. PATENT DOCUMENTS

| | | | | |
|---|---|---|---|---|
| 2,505,972 A | * | 5/1950 | Johnson | 124/76 |
| 2,583,463 A | * | 1/1952 | Rene | 124/64 |
| 4,523,507 A | * | 6/1985 | Magoon | 89/7 |
| 4,819,610 A | * | 4/1989 | Lacam et al. | 124/75 |
| 4,951,644 A | * | 8/1990 | Bon | 124/75 |
| 5,647,338 A | * | 7/1997 | Martin | 124/75 |
| 2002/0148456 A1 | * | 10/2002 | Liang | 124/74 |
| 2004/0065310 A1 | * | 4/2004 | Masse | 124/75 |
| 2004/0237953 A1 | * | 12/2004 | Axelsson | 124/73 |

* cited by examiner

*Primary Examiner*—Troy Chambers
(74) *Attorney, Agent, or Firm*—Browdy and Neimark, PLLC

(57) ABSTRACT

An apparatus for launching balls for sports practice comprising a tank (2) for housing a pressurised gaseous fluid, connected by means of an exhaust duct (5) to a launch tube (3) whose section substantially corresponds to that of a ball (4) to be launched, and which has a seat (8) for positioning the ball (4). A rapid opening device (6) allows to discharge on command the fluid from the tank (2) to the launch tube (3) through the exhaust duct (5), in order to cause the launch of the ball (4). The apparatus (1) further comprises throttling means (37) mounted in the exhaust duct (5) to determine the transfer of the fluid from the tank (2) to the launch tube (3), as well as means (43) for varying the position of the seat (8) for the ball (4) to be launched, which can be operatively associated to each other to vary the position of the seat (8) according to the regulation of the transfer of the fluid from the tank (2) to the launch tube (3) and vice versa, according to a pre-determined relationship.

35 Claims, 9 Drawing Sheets

APPARATUS FOR LAUNCHING BALLS FOR SPORTS PRACTICE

TECHNICAL FIELD

The present invention relates to an apparatus for launching balls for sports practice of the type described in the preamble of claim 1.

Said apparatus is destined in particular to be used to train association football players, but it can also be used in any sport, or game, which uses balls, such as: tennis, volleyball, American football, rugby football, etc. . . . Additionally, said apparatus can also be used for simple entertainment games. Hereinafter, however, for the sake of simplicity of description, explicit reference shall be made to association football, or football, only.

When training players it is particularly important to provide them with a series of shots that are, when necessary, repetitive in the ball launch velocity, value and elevation arc.

Once the reference ball and the vertical plane in which the trajectory must be included are set, the elevation arc and launch velocity parameters uniquely identify both the geometry of the trajectory, and the hourly travel law, allowing the immediate evaluation of significant parameters such as: range, velocity and angle of impact, time of flight, etc. . . .

In football, for instance, the balls used are those prescribed by current regulation. In particular, currently the footballs defined as: "SIZE 5 APPROVED FIFA" must have a mass of between 420 and 445 grams, and a circumference between 68.5 and 69.5 cm.

Since pass distances in football may reach and even exceed 40-50 meters, and most frequently range between 10 and 25 meters, with angles of impact of between 20 and 50 degrees, to train players correctly it is fundamentally important to have the capability of simulating similar situations. Consequently, the required launch velocities may even reach 40/s, and more often range between 10 and 25 m/s.

Currently, during practice sessions, the launches are carried out by trainers or by the player's team mates.

Consequently, launches are often different from each other and even inaccurate.

BACKGROUND ART

Currently, there are several known apparatuses which allow to launch balls for sports practice purposes, but generally they are apparatuses for launching tennis balls or baseballs.

It should be noted that there are considerable differences in terms of size, weight, and weight/volume ratio among the balls used in different sports.

Said differences make it impossible to use an apparatus devised to launch tennis balls to launch footballs instead, or to adapt it for this purpose.

Among the different existing apparatuses the most interesting are those which are easy to transport, and which can be easily operated in any point, for instance within a football field.

Examples of similar easily transported apparatuses are disclosed in the patents U.S. Pat. No. 3,662,729, GB 2 118 443 and U.S. Pat. No. 4,774,928.

In particular the patent U.S. Pat. No. 4,774,928 discloses an apparatus for launching tennis balls for training purposes comprising a tank for pressurised air, a launch tube whose section substantially corresponds to that of a tennis ball, and which has an open end for launching the ball and an end connected to the tank by means of a quick opening device, which allows rapidly to discharge the air contained in the tank through the tube, thereby causing the launching of the ball.

However, known apparatuses are not suitable for launching footballs in the aforesaid manner. On one hand, they do not allow an effective launch of a football, which has very different weight and diameter compared to tennis balls. Moreover, apparatuses of this kind on one hand do not assure a repetitive launch of the ball, on the other hand do not allow to adjust launch velocity (at least, non in an easy and precise manner).

DISCLOSURE OF INVENTION

In this situation the technical task constituting the basis for the present invention is to obtain an apparatus for launching balls for sports practice which overcomes the aforementioned drawbacks. In particular, the technical task of the present invention is to obtain an apparatus for sports practice that is simple, compact, transportable, efficient in the execution of the shots, economical and safe in use, and able to provide the ball, with precision, reproducibility and adjustment capability, with the necessary impulse to attain the required launch velocity.

The specified technical task and the indicated objects are substantially achieved by an apparatus for launching balls for sports practice as described in the appended claims.

DESCRIPTION OF THE DRAWINGS

Further features and advantages of the invention shall become more readily apparent from the detailed description that follows of some preferred, but not exclusive, embodiments of an apparatus for launching balls for sports practice, illustrated in the accompanying drawings, in which.

Figure 1:
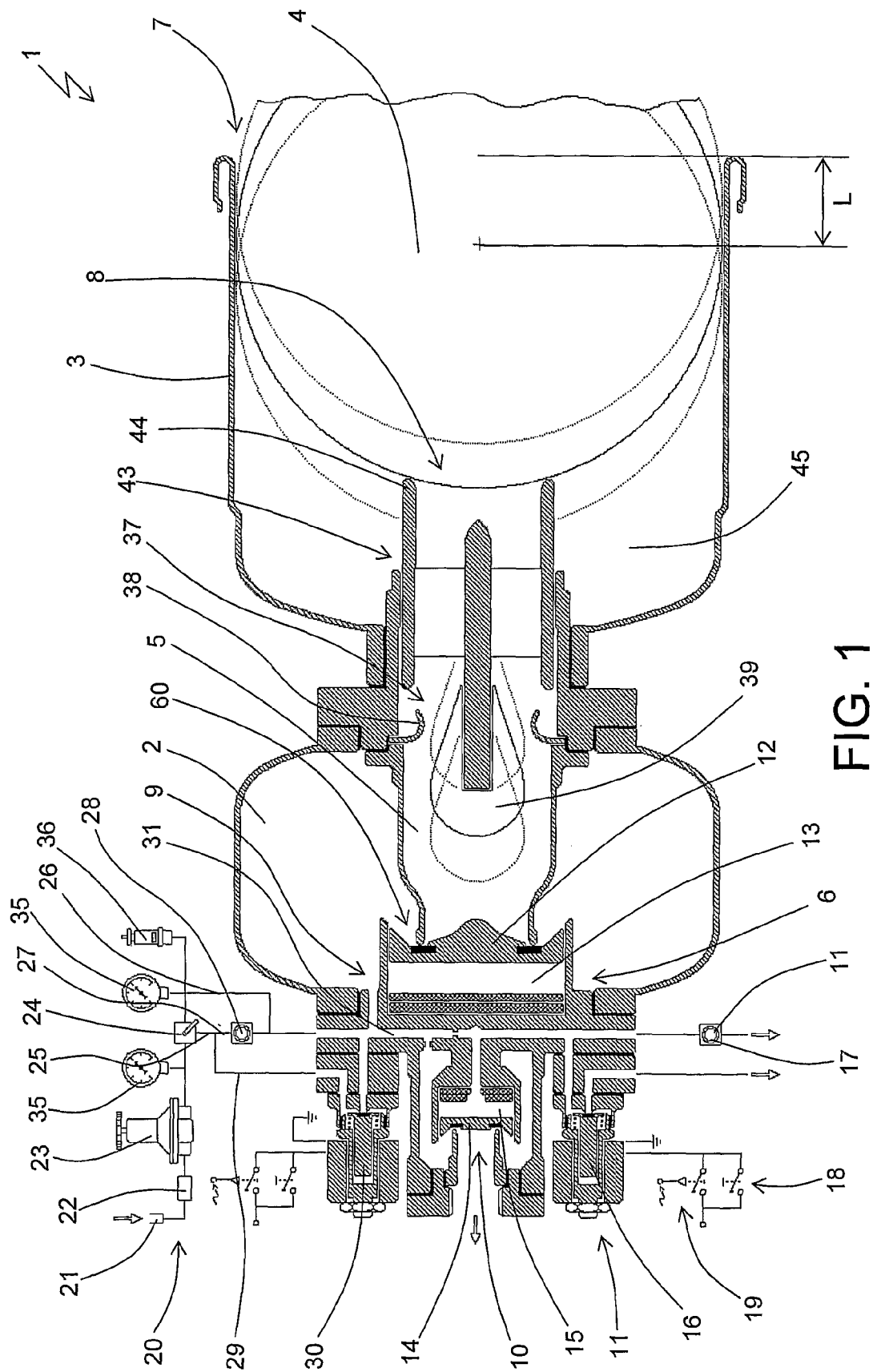
FIG. 1 shows a partially sectioned schematic view of an apparatus for launching balls for sports practice according to a first embodiment of the present invention.
Figure 2:
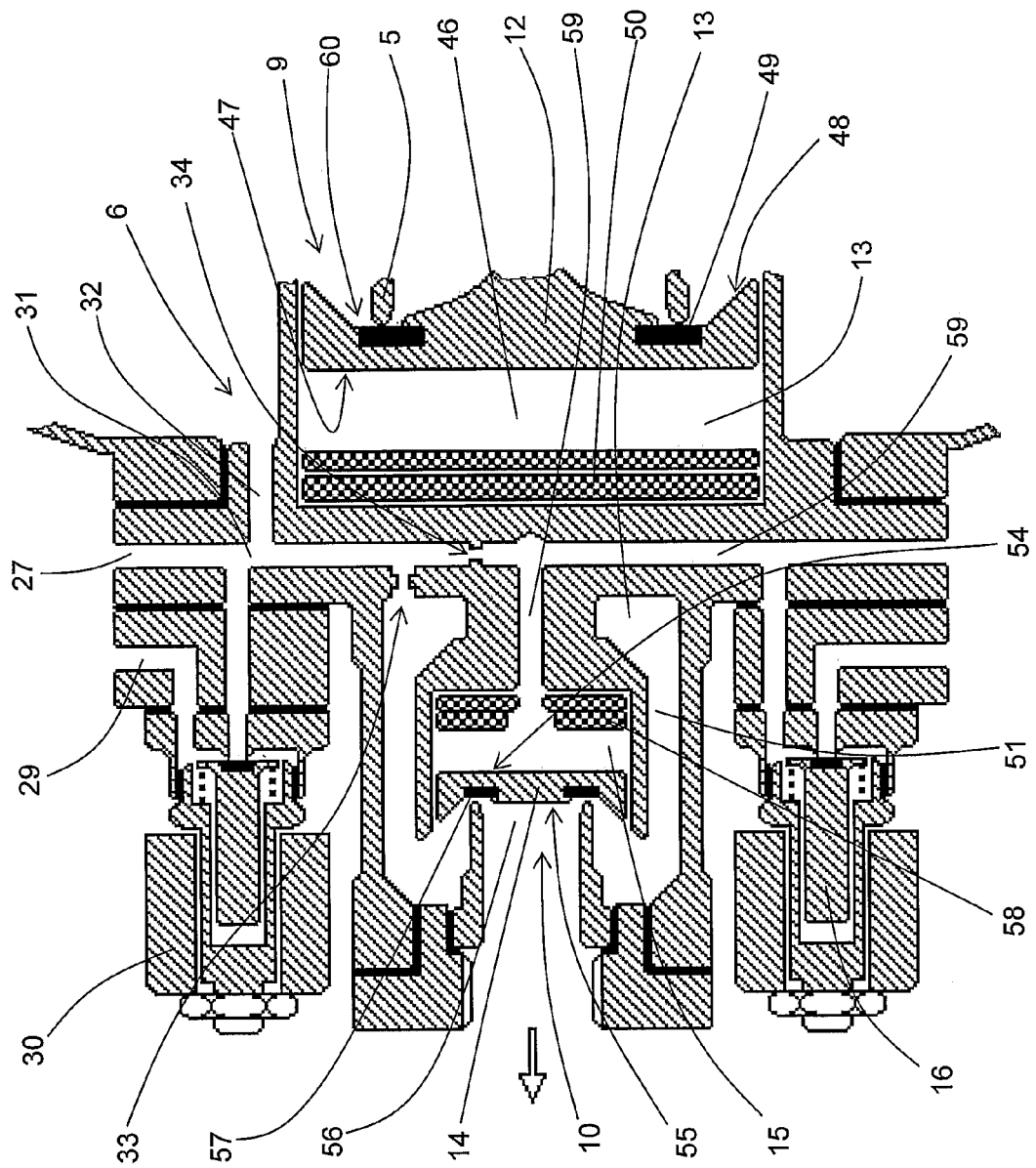
FIG. 2 shows an enlarged detail of the apparatus of FIG. 1, with some parts removed.
Figure 4:
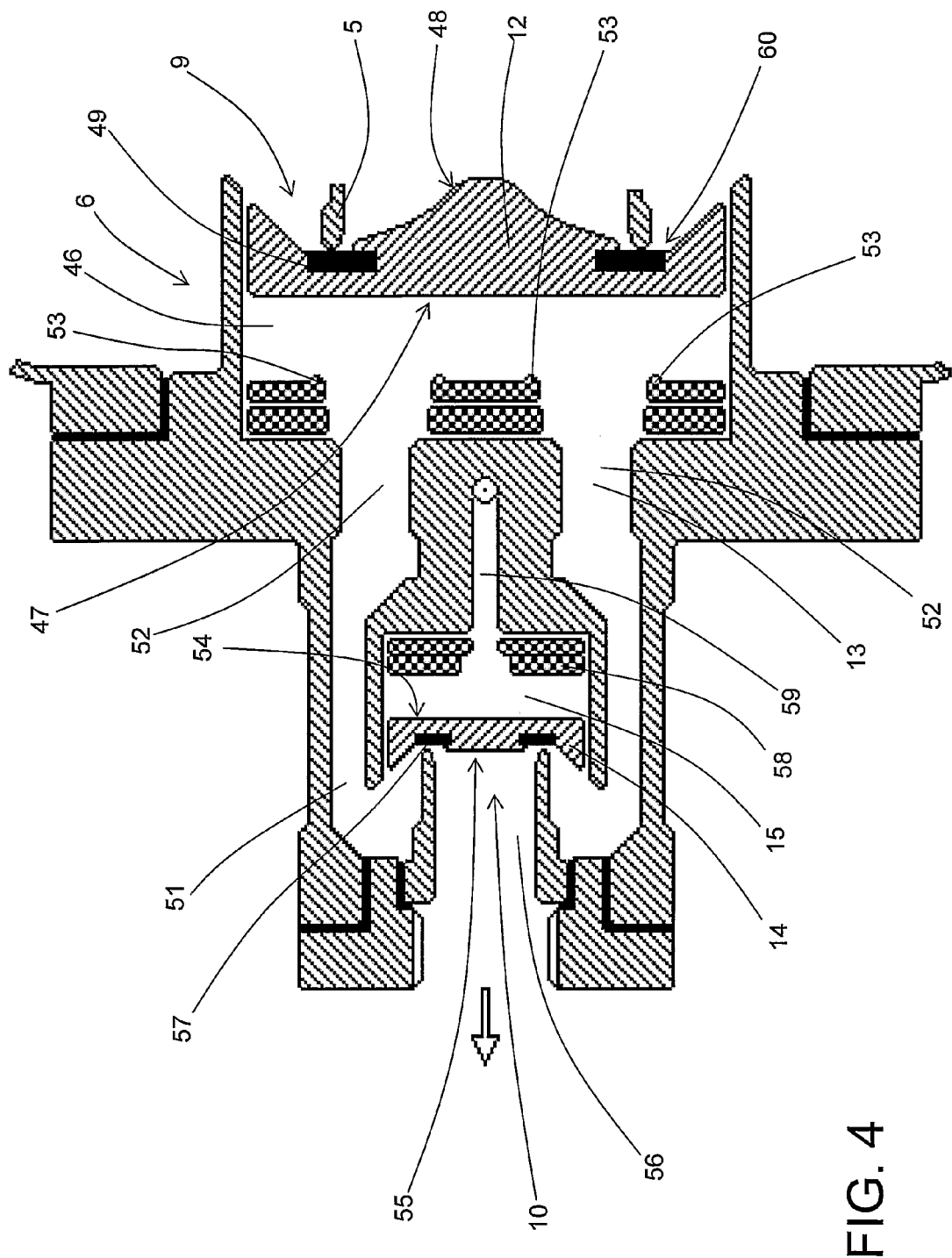
FIG. 4 shows an enlarged detail of the apparatus of FIG. 3.

Although in FIGS. 1, 2 and 4 the sealed connections between the different parts constituting the structure of the sectioned part of the apparatus are highlighted with bold lines, for the sake of simplicity they are not highlighted in the other figures, where they are nonetheless considered to be present.

With reference to the aforementioned figures, the reference number 1 globally designates an apparatus for launching balls for sports practice according to the present invention, which comprises a tank 2 for containing a gaseous fluid (advantageously air) under pressure, a launch tube 3 whose section substantially corresponds to that of a ball 4 to be launched, an exhaust duct 5 for the fluid operatively connected between the tank 2 and the launch tube 3, and a quick opening device 6 for discharging, on command, the fluid from the tank 2 to the launch tube 3 through the exhaust duct 5, in order to cause the launch of the ball 4.

In other embodiment variants, not illustrated herein, the exhaust duct 5 can also coincide with the innermost part of the launch tube 3, although preferably the exhaust duct 5 has a smaller section than the launch tube 3.

The launch tube 3 has an open end 7 for launching the ball 4 and, internally, a seat 8 for positioning the ball 4.

In the illustrated embodiments, the quick opening device 6 comprises a quick opening main valve 9 which controls the discharge of the fluid from the tank 2 to the exhaust duct 5, a control valve 10 which drives the opening of the main valve 9 and at least an actuating valve 11 which determines the actuation of the control valve 10.

Other embodiments provide both for the use of only the main valve 9, which can be actuated directly by the user, and the use of a quick opening main valve 9 actuated directly by an actuating valve. In the illustrated embodiments, the main valve 9 comprises a first movable obturator 12, actuated by means of a first pressurisable chamber 13, said obturator 12 being in closed position when the first chamber 13 is pressurised and going to the open position when the first chamber 13 is depressurised.

The control valve 10 causes, when it is opened, the depressurisation of the first chamber 13, in the manners described hereafter.

In regard to the control valve 10 it, similarly to the main valve 9, comprises a second movable obturator 14 actuated by means of a second pressurisable chamber 15. The second obturator 14, too, is in the closed position when the second chamber 15 is pressurised and goes to the open position when the second chamber 15 is depressurised.

In turn, the actuating valve 11 causes, when it is opened, the depressurisation of the second chamber 15.

According to the illustrated embodiments, there are two actuating valves 11, mounted in parallel and able to be operated independently. They are respectively a solenoid valve 16 and a manual valve 17, each of which can in any case be present even alone, in less complete embodiments. Advantageously, the actuating valve constituted by a solenoid valve 16 can be operated both by means of an electrically connected push-button 18, and by means of a remote control 19 which allows it to be controlled from a distance.

The apparatus 1 also comprises, in the illustrated embodiment, a circuit 20 for pressurising the tank 2, which also determines the pressurisation of the first and of the second chamber 13, 15. It is connected to a system (not shown) for feeding a pressurised fluid, typically compressed air (7÷9 bar), such as a compressor or a bottle, through a pneumatic quick coupling connection. Downstream thereof are positioned in sequence a filter 22 for the incoming air, a pressure reducer 23, to assure a variable charge pressure (for instance 1.5÷9 bar), and a two-way pneumatic selector 24, alternatively to set the manual charge (first way 25) or automatic (second way 26) of the launch apparatus 1.

The first way 25 (manual) in turn is subdivided into a third way 27 with manual charging valve 28, and into a fourth way 29 with electromagnetic charging valve 30. The arrangement of the third and fourth way 27, 29 is similar, from the structural point of view, to that of the two actuating valves 11 in parallel described above, whereto reference is made for the details (also for the actuation by means of push-button or remove control of the electromagnetic valve 30). Similarly, then, either the manually actuated charging valve 28 alone or the electromagnetic actuated valve 30 alone can be provided along the second way 26.

The second way 26 (automatic charge) is reconnected to the first way 25 downstream of the two charging valves 28, 30, thus bypassing their control.

At this point the charging conduit 31 into which the first and the second way 25, 26 open, has a first orifice 32 in connection with the tank 2, and a second and a third orifice 33, 34, with smaller sections, connecting respectively with the aforesaid first and the second chamber 13, 15.

The sections of the orifices 32, 33, 34 are so dimensioned as to allow, at the moment of the charging operation, first of all the closure in successive sequence of the second obturator 14 and of the first obturator 12, and subsequently, the charging to the same pressure, the one determined by the pressure reducer 23, of the whole circuit (including the tank 2, the second chamber 15 and the first chamber 13).

On the illustrated pressurisation circuit 20 are also provided two control gauges 35 and a safety valve 36.

Additionally, the apparatus 1 comprises throttling means 37 mounted in the exhaust duct 5 to determine the transfer of the fluid from the tank 2 to the launch tube 3.

Figure 3:
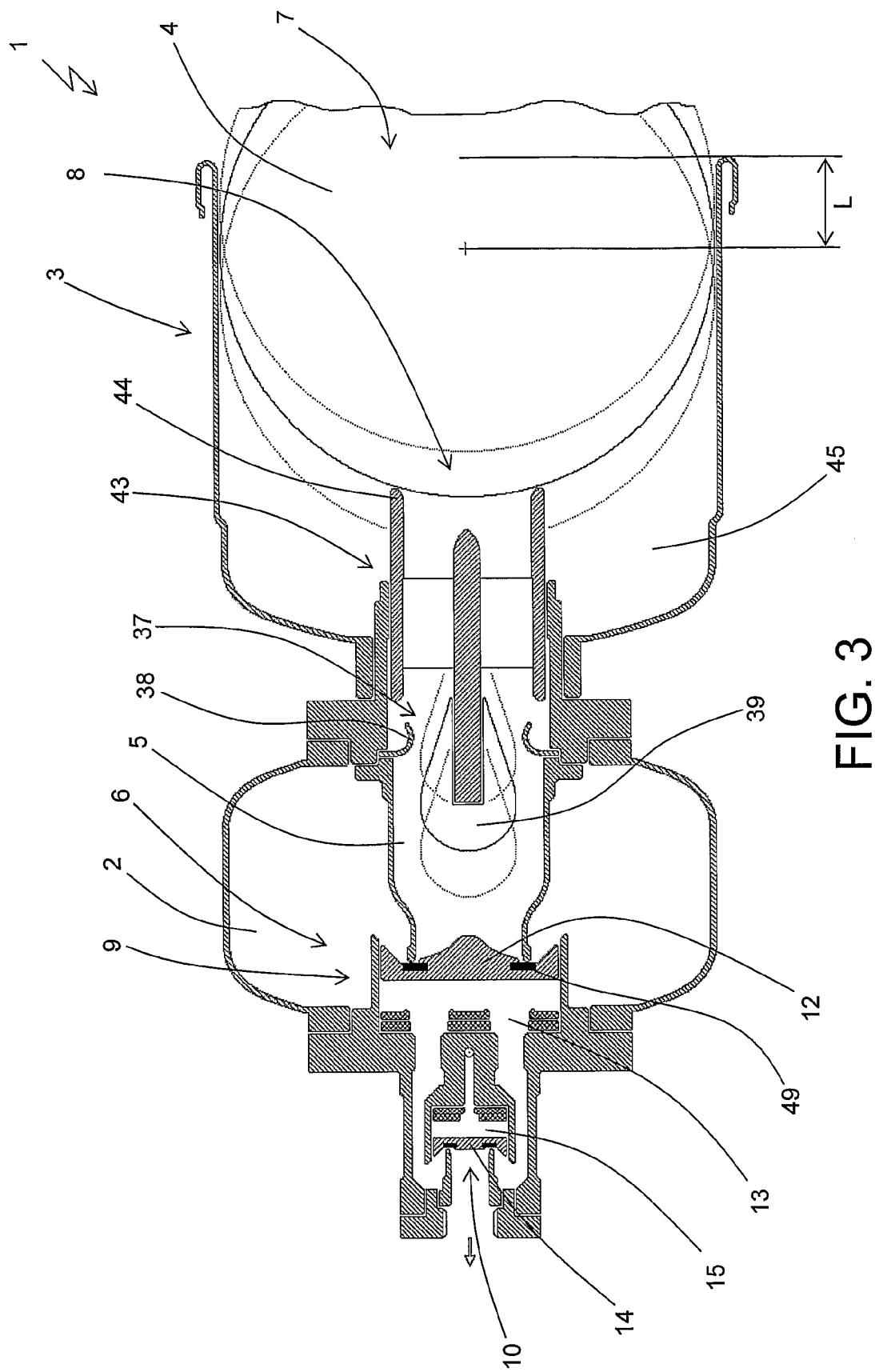
FIG. 3 shows part of the apparatus of FIG. 1 according to a section plane rotated by 45° around the central axis of the apparatus, relative to the section plane of FIG. 1.
Figure 5:
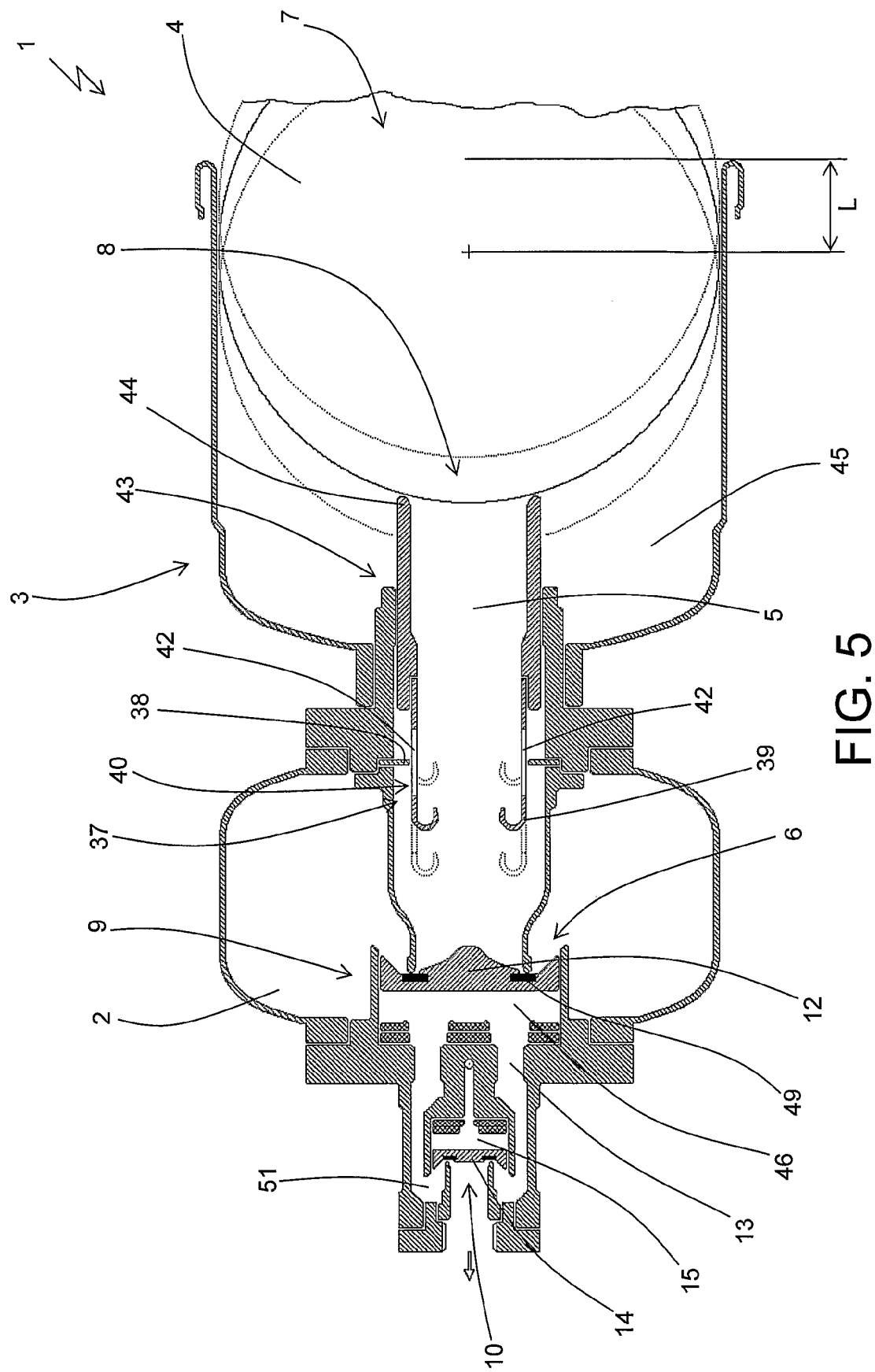
FIG. 5 shows a schematic view, partially sectioned according to the section plane of FIG. 3, of a second embodiment of the apparatus of the present invention.

FIGS. 1, 3 and 5 show the most advanced embodiments of the throttling means 37, in which the throttling means allows to regulate the transfer of the fluid from the tank 2 to the launch tube 3. Both in the first (FIGS. 1 and 3) and in the second illustrated embodiment (FIG. 5), the throttling means 37 comprise a fixed part 38 and a part 39 that is movable relative to the fixed part 38, positioned in such a way that the displacement of the movable part 39 relative to the fixed part 38 determines a variation of the effective section of the exhaust duct 5 in correspondence with the throttling means 37.

In the first embodiment, the fixed part 38 is constituted by a ring like seat which determines a narrowing in the exhaust duct 5, whilst the movable part 39 is constituted by a bulb obturator movable coaxially to the aforesaid ring like seat, in order to vary the effective section for the passage of the fluid within the exhaust duct 5.

In the second embodiment, the fixed part 38 is also constituted by a ring like seat positioned within the exhaust duct 5, within which a movable sleeve can slide. In particular, the outer wall 40 of the sleeve slides in proximity to the ring like seat.

Said sleeve also has a narrowing 41 in correspondence with its inlet section for the fluid, and one or more slits 42 placed in correspondence with the ring like seat, straddling the seat, and which allow the lateral entry of the fluid into the sleeve upstream of the fixed part 38.

In this way, varying the positioning of the movable part 39 it is possible to modify the section for the fluid path through the slits 42, and hence the effective section for the fluid path through the throttling means 37.

Figure 6:
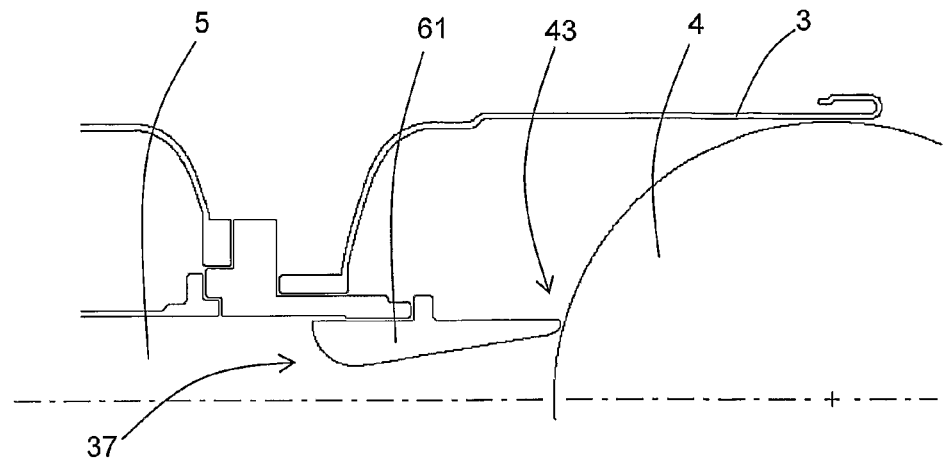
FIG. 6 shows a partial and sectioned schematic view of a detail of a third embodiment of the apparatus of the present invention.
Figure 7:
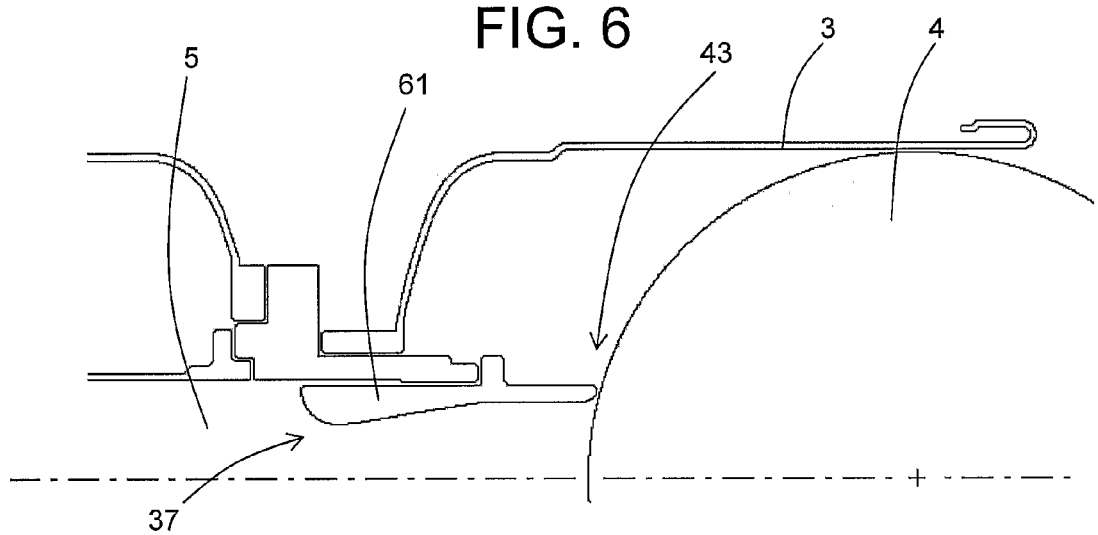
FIG. 7 shows a partial and sectioned schematic view of the apparatus of FIG. 6 in a second operative condition.
Figure 8:
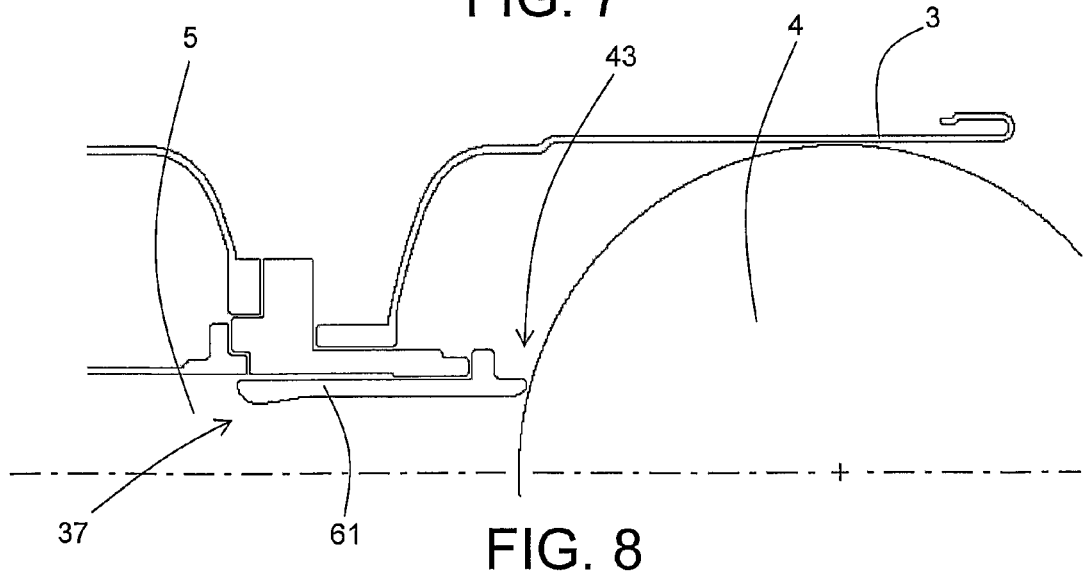
FIG. 8 shows a partial and sectioned schematic view of the apparatus of FIG. 6 in a third operative condition.

In the third embodiment, illustrated in FIGS. 6 through 8, the throttling means 37 comprise one or more interchangeable ring nuts 61, each such as to assure a different throttling section. In particular, the accompanying figures show three different ring nuts 61, each able to provide a different throttling in the exhaust duct 5. As shown, each ring nut 61 has a different profile, and, among those illustrated herein, the ring nut 61 of FIG. 6 is the one that determines the smallest section for fluid path.

Figure 9:
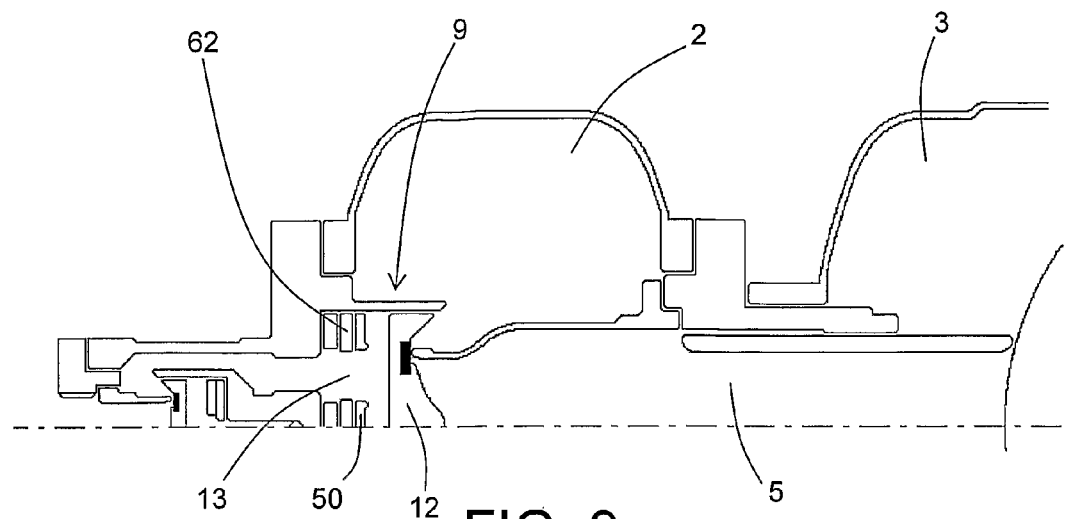
FIGS. 9 and 10 show a partial and sectioned schematic view of two variants of a fourth embodiment of the present invention.
Figure 10:
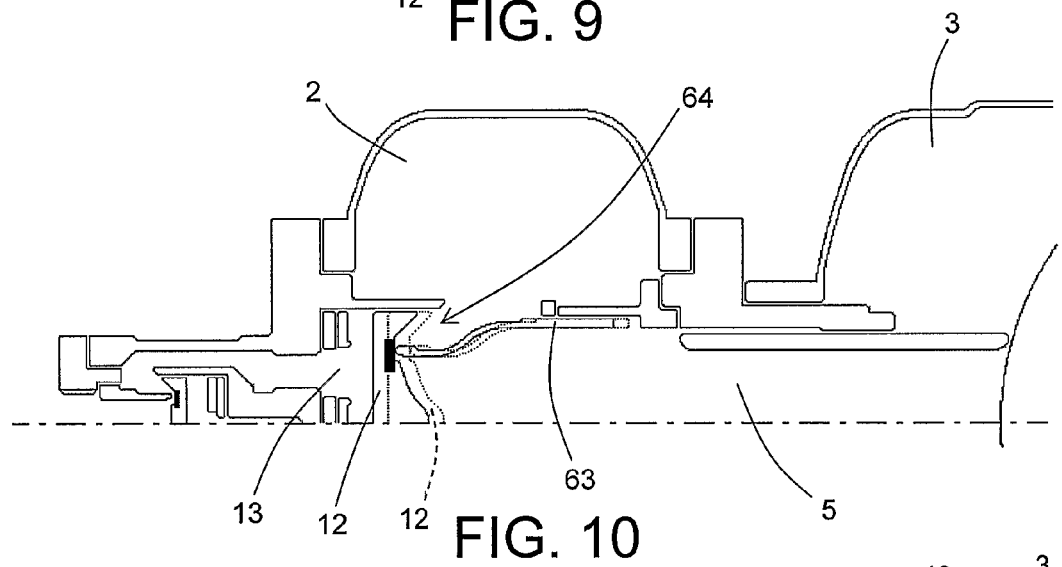

In the fourth embodiment illustrated in FIGS. 9 and 10 in two variants thereof, the throtting means 37 vary the section for the passage of the fluid in the main valve 9, acting on the travel of the first obturator 12.

A first manner (FIG. 9) of varying the travel of the first obturator 12 consists of varying the end stop position of the obturator 12 (i.e. varying the point of arrival of the first obturator 12 at the completion of the opening), acting on the bottom of the first chamber 13, or making it axially adjustable relative to the rest of the first chamber 13, or providing it with one or more interchangeable inserts 62 (each having different thickness).

FIG. 9 shows the insertion of an insert 62 underneath the first damping element 50 (described in detail hereafter).

A second manner of varying the travel of the first obturator, instead, consists of varying the position of the first obturator 12 when the main valve 9 is closed. In FIG. 10, this is achieved by axially adjusting the position of the inner part 63 of the exhaust duct 5 against whose end 64 bears in closure the first obturator 12.

The apparatus 1 is also preferably provided with means 43 for varying the position of the seat 8 for the ball 4 to be launched relative to the launch tube 3.

In the accompanying figures the seat 8 for the ball 4 is constituted by the end 44 of the exhaust duct 5 connected to the launch tube 3, and it is axially adjustable relative to the launch tube 3.

Advantageously, to improve control over the performance of the launch apparatus 1, it is preferable for the throttling means 37 and the means 43 for varying the position of the seat 8 for the ball 4 to be operatively associated to each other in such a way as to vary the position of the seat 8 according to the adjustment of the transfer of the fluid from the tank 2 to the launch tube 3 and vice versa, all according to a predetermined relationship, to be determined in the design phase.

In the examples illustrated in FIGS. 1 through 5, this is obtained by rigidly fastening the seat 8 for the ball 4 to be launched to the movable part 39 of the adjustment means, so that the displacement of the movable part 39 causes a corresponding displacement of the seat 8 for the ball 4 to be launched within the launch tube 3.

In the example illustrated in FIGS. 6 through 8, each interchangeable ring nut 61 determines, in addition to a predefined throttling of the exhaust duct 5, also a different positioning of the seat 8, appropriately correlated to the related throttling.

In the case instead of the fourth embodiment, means 43 for varying the position of the seat 8 for the ball, are not directly associated to the throttling means 37. For this reason, it will be opportune to adjust the means 43 for varying the position of the seat 8, every time the adjustment of the throttling means 37 will be modified.

Thanks to the ability to adjust the axial position of the seat 8 for the ball, between the seat 8 and the end of the launch tube 3 opposite to the open end 7 is identified, when the ball 4 is on the seat 8, a third chamber 45 in which the fluid can expand at the moment of the launch.

Advantageously, the injection of the fluid into the launch tube 3 takes place in precise correspondence with the seat 8 for the ball 4, since the ball 4 substantially closes the outlet of the exhaust duct 5.

Figure 12:
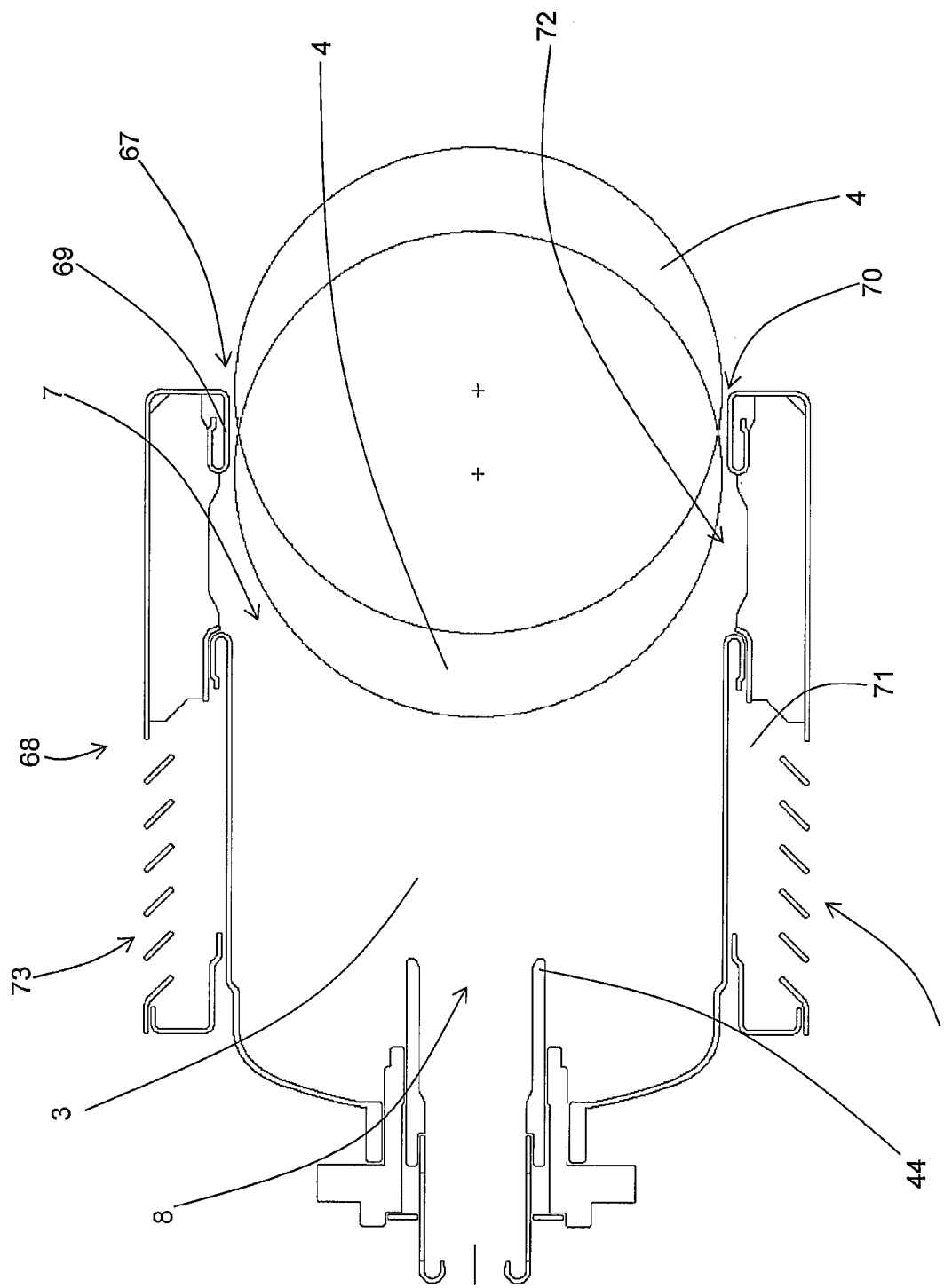
FIG. 12 shows a partial and sectioned schematic view of an additional element able to be associated to each of the embodiments of the present invention illustrated in FIGS. 1 through 11.

As shown in FIG. 12, the apparatus of the present invention can be provided with appropriate means for enhancing launch precision 67.

In the embodiment shown in FIG. 12, the means for enhancing launch precision 67 are associated to means 68 for reducing launch noise, described in detail hereafter.

In this embodiment the means 67 for enhancing launch precision are constituted by an annular element 69 positioned at an appropriate distance from the open end 7 of the launch tube 3.

Advantageously, the annular element 69 has an inner diameter that is slightly larger than the diameter within the launch tube 3, in such a way that at the passage of the ball 4, between the ball and the annular element 69 itself, there is a small meatus 70, so that the ball movement is not slowed by friction or interference.

As stated, the apparatus 1 of the present invention can also be provided with means for reducing the noise of the launch 68, such as a silencer.

One type of said noise reducing means 68 is shown in FIG. 12 in combination with the annular element 69. In general, however, there may also be no correlation between the means for enhancing launch precision 67, and the noise reducing means 68.

In the illustrated embodiment, the noise reducing means 68 are essentially constituted by an annular chamber 71, of adequate volume, mounted coaxially to the launch tube 3. Advantageously, the annular chamber 71 is mounted in removable way.

The annular chamber 71 has an inner slit 72 obtained in correspondence with the open end 7 of the launch tube 3, and a plurality of lateral slits 73.

The pressurised air that exits the launch tube 3 then enters the chamber 71 through the inner slit 72 and is discharged to the atmosphere through the lateral slits 73.

The total passage section is not much smaller than the section of the launch tube 3.

Advantageously, although this solution is not shown in the accompanying figures, the inner surfaces of the annular chamber 71, and other parts of the apparatus, can be coated with sound-absorbing material.

Although they are not described herein, specific silencer devices can also be adopted for the other noise sources of the apparatus, and in particular, the noise of the discharge to the atmosphere from the chamber of the main obturator 12, and the shock waves coming from the mouth of the element which defines the seat 8 for positioning the ball.

The latter can generate a shock pressure wave in a directing cardioid, relatively narrow, concentrated around the direction of launch (axis of the launch tube 3). They are mainly present with high charging pressures and operation of the launch operation without the ball 4 in the launch tube 3.

Before describing the operation of the apparatus 1 of the present invention, a more detailed analysis shall be provided of the structure of the rapid opening device 6 and of the pressurisation circuit 20 in the form in which they are illustrated in the accompanying figures (in particular, see FIGS. 2 and 4).

As stated, the control valve 10 is conceptually similar to the main one, but has smaller dimensions. Although a determined type of rapid opening valve (disc valve) is described herein, other types of rapid opening valves (membrane, etc. . . . ) can be used, provided they allow suitable performance. In the specific case, in the main valve 9 the first disc obturator 12 slides within a cylindrical portion 46 of the first chamber 13, and it has an inner wall 47 oriented towards the first chamber 13, and an outer wall 48 whose central part faces the exhaust duct 5, and whose peripheral annular part instead faces the fluid tank 2. In this way, when the disc is in closed position, it bears on the exhaust duct 5 and the seal is assured by a first sealing ring 49 (made, for instance, of a resilient material such as rubber) which separates the central part from the annular part.

In correspondence with the base wall, facing the first obturator 12, of the cylindrical portion 46 of the first chamber 13, is also positioned a first damping element 50 whose purpose is to deaden the impact of the first obturator 12 with said wall of the cylindrical portion 46 of the first chamber 13, at the time of the opening of the main valve 9.

The cylindrical portion 46 of the first chamber 13 is coaxial to an annular portion 51 of the first chamber 13 and in communication therewith through connecting holes 52 obtained through the base wall of the cylindrical portion 46.

Said holes 52 are visible in FIGS. 3 and 4 which show a section of the launch apparatus 1 constructed with a plane rotate by 45° around the central axis of the launch tube 3, relative to the section plane of FIGS. 1 and 2. In the illustrated example there are four connecting holes 52 between the two portions of the first chamber 13.

The connecting holes 52 also extend through the first damping element 50. The latter, in order to improve performance, can be provided with a raised edge 53 around each connecting hole; thanks to said edge 53, at the time of the opening of the main valve 9, between the first obturator 12 and the damping element an air cushion is created which brakes the motion of the first obturator 12, as shall be described better hereafter.

Internally and coaxially to the annular portion 51 of the first chamber 13 is also positioned the control valve 10 whose structure is similar to that of the main valve 9.

In the control valve 10 as well, the second disc obturator 14 slides within a second cylindrical chamber 15, and has an inner wall 54 oriented towards the second chamber 15, and an outer wall 55 whose central part faces an opening 56 for discharging to atmospheric pressure, and whose peripheral annular part faces the annular portion 51 of the first chamber 13. In this way, when the second obturator 14 is in closed position, it bears on the exhaust opening 56 and the seal is assured by a second sealing ring 57 (made for instance of a resilient material such as rubber), which separates its central part from the annular part.

In correspondence with the base wall, which faces the second obturator 14, of the second chamber 15, is, in this case as well, positioned a second damping element 58 whose purpose is to dampen the impact of the second obturator 14 against said wall of the cylindrical chamber, at the moment of the opening of the control valve 10.

The second chamber 15 is in communication with the third orifice 34 of the charging conduit 31, through a connecting channel 59 obtained through its own base wall.

Said channel also extends through the second damping element 58, which similarly to the first, can be provided with a raised edge (not shown) around the connecting channel 59 to generate an air cushion between the second obturator 14 and the second damping element 58 at the moment of the opening of the control valve 10.

In the illustrated examples, the connecting channel 59 has two connecting branches, as stated, respectively to the second chamber 15 and to the charging conduit 31, and third branch connected to the actuating valve (or valves) 11.

Lastly, although they are not expressly illustrated and/or described herein, to the apparatus 1 of the present invention can also be added further components, such as a support structure which allows to orient the launch tube 3 with the desired inclination (elevation arc), a system for the automatic loading of the ball 4 to be launched, and an electronic control unit capable of automatically managing the operation of the apparatus 1, controlling the charging system (charging pressure), the training, the elevation arc, the moment of launch, . . .

In regard to the operation of the apparatus 1 of the present invention, it takes place in the following manner.

At the moment of the opening of the actuating valve 11 (manual or electromagnetic) the second chamber 15 of the control valve 10 is rapidly depressurised, through the connecting channel 59, causing the movement of the second obturator 14 to the open position. Consequently, the first chamber 13 is placed in communication with the outside by means of the exhaust opening 56, and it depressurises rapidly, in turn causing the displacement of the first obturator 12 to the open position. The tank 2 is thus in communication with the launch tube 3, and thereby a sudden transfer of fluid from the tank 2, to the third chamber 45 positioned behind the ball 4 to be launched, but appropriately regulated by the throttling means 37.

The ball, which until that moment was bearing on its own seat 8, starts its own acceleration determined by the momentum transfer from the fluid and by the growing increase of the pressure in the launch tube 3.

The acceleration of the ball depends on the force resulting from the dynamic pressure stresses, and continues as long as they maintain their effects. Hence, when the centre of the ball has moved sufficiently beyond the outlet end of the launch tube 3 (i.e. for about one third of the radius of the ball), these effects vanish and the ball continues its trajectory having reached the desired launch velocity. From that moment the ball is subjected only to the force of gravity, to air drag, and, in case, to the undesired presence of wind. The resulting trajectory can easily be determined as a mere ballistic problem.

The situation is slightly different when the apparatus is also provided with the means 67 for enhancing launch precision, constituted by the annular element 69. At the moment of the launch, after overtaking the open end 7 of the launch tube 3, the ball 4 travels through a short free segment, allowing the radial release of any residual overpressure in the launch tube 3.

Subsequently, passing at full speed within the annular element 69, the ball is subjected to the fluid dynamic forces generated in the narrow meatus 70 between the ball and the annular element 69. The axial components of these forces generate a slight slow-down of the ball, whilst the radial components determine an effective axial centring thereof in the direction of the motion. Consequently, launch precision is enhanced.

The effective barrel length parameter L is defined here as the distance, measured on the axis of the launch tube 3, between the centre of the ball and the centre of the outlet section of the launch tube 3.

To obtain an optimal operation of the apparatus 1, the effective barrel length L should be correlated to the fluid passage section, determined by the throttling means 37, i.e. to the position of the movable part 39 relative to the fixed part 38. This is because excessively long barrels determine, before the ball exits, a quick slowing of the ball, allowing only the limited outgoing velocity which the throttling means 37, as adjusted, allow.

Analysing in greater detail the behaviour of the main and control valves at the moment of opening, being structurally similar, they have a similar behaviour. Thus, referring in particular to the main valve 9 the sequence of the launch events can be specified as follows.

A very rapid depressurisation of the first chamber 13, due to the nearly instantaneous connection of the annular portion 51 thereof to the outside, in a first step brings to zero the closing force of the first obturator 12, then, inverting said force, causes the rapid opening displacement of the same obturator, due both to the pressure differences between the first chamber 13 and the tank 2 and between the first chamber 13 and the exhaust duct 5, and to the simultaneous and progressive momentum transfer from the fluid to the first obturator 12 in the rapid trajectory variation whereto the fluid itself is subjected in correspondence with the closure seat 60 of the main valve 9. In the first steps of the this process, pressure increases rapidly also in the whole exhaust duct 5 by virtue of a sort of "inertial confinement" due to the presence of the ball which, contributes to close the outlet of the exhaust duct 5 in contact with the ball.

The complex dynamic of these phenomena leads to the maximum acceleration and opening velocity of the obturator 12, which has allowed to reach opening time constants of 0.5-0.8 milliseconds, even with an apparatus 1 made with commonly used metallic materials, strong but not particularly light. The use of light and strong materials, such as titanium alloys, would in fact enable further improvements, especially in regard to the movable parts of the apparatus.

The obturators reach the respective maximum displacements without significant bounces, or other negative effects, by virtue of the impact with the damping elements (advantageously constituted by discs of resilient material such as rubber), whose opportune profiles described above allow for effective damping also by means of the air cushion which is formed between each obturator and the corresponding damping element, at the moment of the contact of the obturator with the raised edges of the damping element.

The mechanical stresses consequent to the impact are thereby reduced, preserving the integrity of the obturators and allowing, for them, the adoption of small masses, thereby obtaining higher opening velocities.

Returning to the discharge of the fluid from the tank 2 to the launch tube 3, during the outflow transient the criticality condition is normally reached in the minimum section of the path of the fluid, determining first Mach 1 to be exceeded, with meta-stable fluid dynamic conditions, immediately followed by shock due to subsonic transition to the stable fluid dynamic state.

Initially this occurs, as stated, first in proximity to the closure seat 60 of the main valve 9, with the obturator slightly open, the exhaust duct 5 not yet sufficiently pressurised and the ball still nearly bearing on its own seat 8.

The criticality condition then moves in proximity to the outlet of the exhaust duct 5, with the obturator sufficiently open but the ball, given its inertia, is practically still close to the initial position. Subsequently, when the ball moves away from its positioner, the criticality conditions again move backwards in proximity to the closure seat 60 or in proximity to the minimal section between the throttling means 37, if the section of this passage has a smaller surface area than the one determined by the instantaneous position of the obturator relative to the seat 8.

The particular profiles of the illustrated obturators safeguard the resilient material of the sealing rings in correspondence with the closure seats, from the dynamic stresses of the shock waves.

The dimensions of the first and of the second chamber 13, 15 and the parameters of the two obturators (weight, dimensions, shape and materials used) must be specifically fixed during the design phase to obtain sufficiently short opening times for the main valve 9, to allow the most rapid acceleration of the ball during the launch phase.

In sum, the main factors which determine the operation of the apparatus 1, in its most complete, are:
the volume of the tank 2 for the pressurised fluid;
the charging pressure of the tank 2;
the opening section of the quick opening device 6;
the opening section of the throttling means 37;
the volume of the third chamber 45, behind the ball;
the effective length of the barrel.

It has been observed that the operation is adjustable and optimised within limited combinations of these factors.

In the embodiments described heretofore, the design choice was to fix at appropriate values both the volume of the tank 2 and the opening section of the quick opening device 6, and to introduce, for practical adjustment purposes, a correlation between the opening section of the throttling means 37 and the effective length of the barrel, determined by the position of the seat 8 whereon the ball initially bears.

This correlation is obtained in such a way that to increasing opening sections of the throttling means 37 correspond suitably increasing barrel lengths. The volume of the third chamber 45, behind the ball, is also thus correlated, assuming diminishing values.

Thus, launch adjustment is conveniently determined, acting only on the two parameters: charging pressure of the tank 2 and effective length of the barrel.

Figure 13:
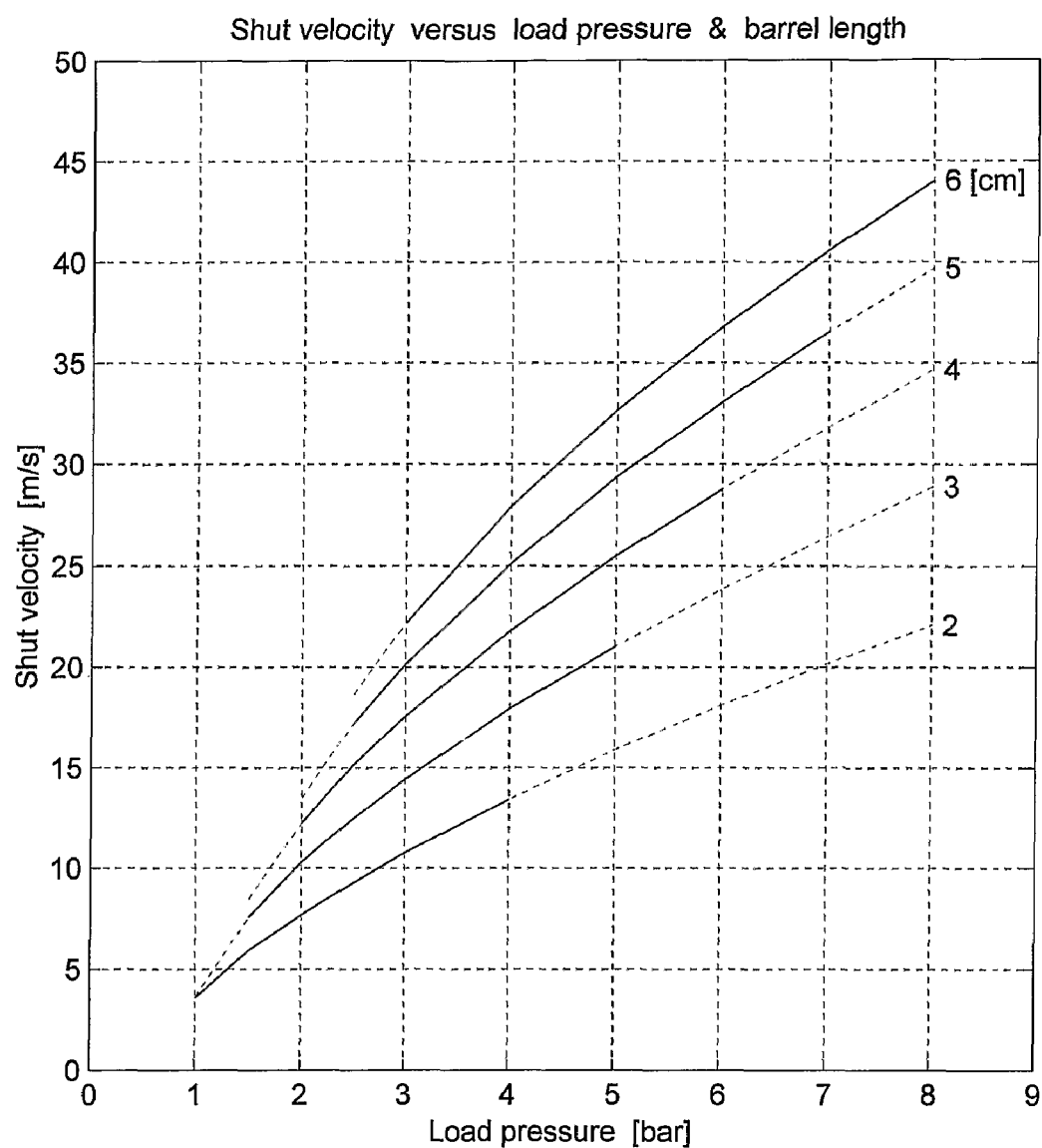
FIG. 13 shows the family of curves characteristics of an apparatus according to the present invention.

FIG. 13 shows the family of curves characteristics of the launch velocity achievable as a function of the charging pressure, with parameters based on the effective length of the barrel.

As shown, each curve has a central segment, in solid lines which represents the range of pressures for which the apparatus 1 operates in optimal way.

Once the launch is completed, the system can be charged either manually or automatically. In this latter case, within 3÷5 seconds from the launch the device is ready for a new launch.

Figure 11:
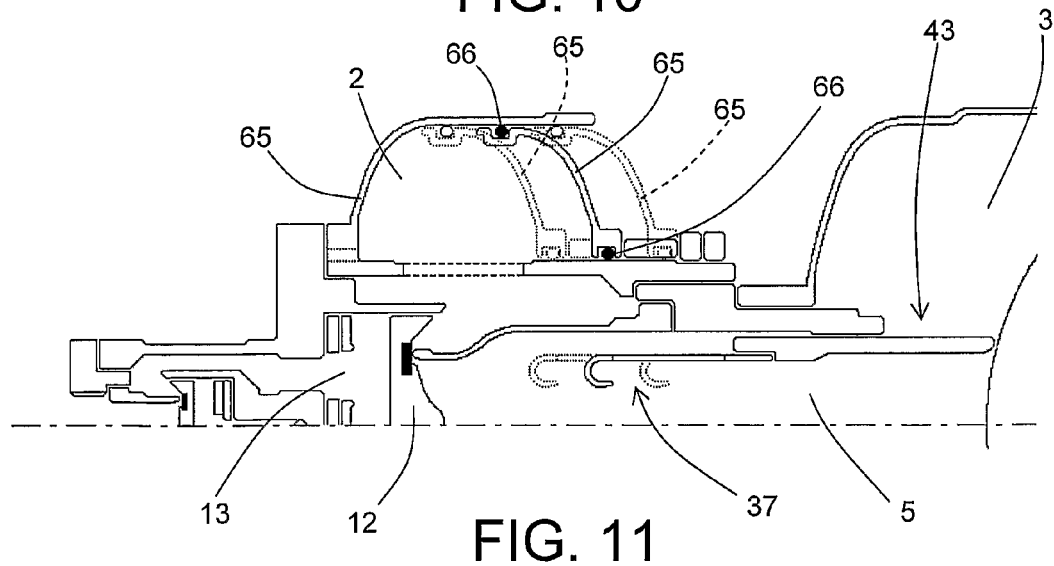
FIG. 11 shows a partial and sectioned schematic view of a fifth embodiment of the present invention.

In the case, instead, of the fifth embodiment shown in FIG. 11 (variant of the embodiment of FIG. 5), it is also possible to vary an additional parameter: the volume of the tank 2. This solution assures a greater versatility of the device as a whole.

The tank is constructed with two half-shells 65 at least one of which is movable relative to the other, to allow the adjustment of its volume (tightness is assured by gaskets 66).

Other embodiments are also possible, in which in addition to the adjustment of the volume of the tank 2, it is also possible to adjust other parameters such as the charging pressure of the tank 2 and the effective length L of the barrel.

As stated, although when the charging starts the entire circuit is substantially in direct contact with the atmospheric pressure, an appropriate dimensioning of the first of the second and of the third orifice 32, 33, 34 assures first of all the closure of the two obturators 12, 14 and subsequently the pressurisation of the whole circuit.

Lastly, in regard to the noise reducing means 68, it should be noted that the residual overpressure in the launch tube 3 can be relatively high with sufficiently high charging pressures of the tank 2 and limited effective barrel lengths L. Thus, when the centre of the ball overtakes the open end 7 of the launch tube 3, said open end is placed in communication with atmospheric pressure and any overpressure is rapidly vented radially, normally followed by a partial eddy with the inversion of the fluid motion field. This phenomenon generates the so-called "mouth noise".

Using the reduction means, the residual overpressure is vented in the annular chamber 71 before discharging in the surrounding atmosphere, through the lateral slit 73.

The present invention achieves important advantages.

The apparatus for launching balls for sports practice of the present invention is compact, light and easily transported.

Moreover, the apparatus is very efficient in the execution of the shots, and able to provide the ball, with precision, reproducibility and adjustment capability, the impulse needed to achieve the required launch velocity.

The apparatus has the further advantage of operating optimally with a simple source of low-pressure compressed air (7–9 bar) such a simple commercial portable compressor. Consequently, the apparatus is also safe in its use.

An additional advantage is that minimal quantities of fluid can be used to provide the necessary impulse for launch.

Thanks to the precision and reproducibility of the launch and the impact parameters, the apparatus can therefore be used to improve players' technical abilities (stop, shot, head shot, etc.). It allows the athlete to assume the sequence of the best bio-mechanical positions dynamically, and to consolidate it with the safe repetition of the motion, reaching what can be defined as the result of motor learning. Fundamentally important is the possibility of repeating the motion under the same conditions, in continuous and assiduous fashion, also with the possibility for the player to view him/herself in action, with the simultaneous use of recording means (closed circuit video cameras and video recorders). It should also be noted that the present invention is relatively easy to implement and that both the cost connected with the implementation of the invention and the operating costs are low.

The invention thus conceived can be subject to numerous modifications and variations, without thereby departing from the scope of the inventive concept that characterises it.

All components can be replaced by other technically equivalent elements and in practice all the materials employed, as well as the shapes and the dimensions of the various components, may be any depending on requirements.

The invention claimed is:

1. An apparatus for launching balls for sports practice comprising:
   a tank (2) for housing a gaseous fluid under pressure;
   a launch tube (3) whose section substantially corresponds to that of a ball (4) to be launched, said tube having an open end (7) for launching the ball (4) and having a seat (8) for positioning the ball (4);
   an exhaust duct (5) of the fluid operatively connected between said tank (2) and said launch tube (3); and
   a rapid opening device (6) for discharging on command said fluid from said tank (2) to said launch tube (3) through said exhaust duct (5), to cause the launching for the ball (4); and
   throttling means (37) mounted in said exhaust duct (5);
   wherein said throttling means are configured to be adjusted for varying an effective section of the exhaust duct such that the effective section determined by the throttling means remains the same during a whole launch.

2. An apparatus as claimed in claim 1, wherein said throttling means (37) comprises a fixed part (38) and a movable part (39) movable relative to the fixed part (38), wherein a displacement of said movable part (39) relative to said fixed part (38) determines a variation in the effective section of the exhaust duct (5) in correspondence with the throttling means (37).

3. An apparatus as claimed in claim 2, wherein said movable part (39) is constituted by a bulb obturator.

4. An apparatus as claimed in claim 2, wherein said movable part (39) is constituted by a sleeve having an outer wall (40) slides proximity to the fixed part (38), an inlet portion for the fluid, and a narrowed portion (41) having a section that is narrower than the section of the inlet portion, and has one or more slits (42) extending astride the fixed part (38).

5. An apparatus as claimed in claim 2, wherein said seat (8) for the ball (4) to be launched is rigidly connected to the movable part (39), the displacement of the movable part (39) causing a corresponding displacement of the seat (8) for the ball (4) to be launched within the launch tube (3).

6. An apparatus as claimed in claim 1, wherein said throttling means (37) comprises one or more interchangeable ring nuts (61), each ring nut (61) defining a different fluid throttling transit section in the exhaust duct (5).

7. An apparatus as claimed in claim 6, wherein each interchangeable ring nut (61) also determines a different position of the seat (8) for the ball (4) within the launch tube (3).

8. An apparatus as claimed in claim 1, wherein said rapid opening device (6) comprises at least one main valve (9) with rapid opening which controls the discharge of the fluid from the tank (2) to the exhaust duct (5).

9. An apparatus as claimed in claim 8, wherein said rapid opening device (6) further comprises at least an actuation valve (11) which determines the actuation of the main valve (9).

10. An apparatus as claimed 9, wherein said rapid opening device (6) further comprises at least a control valve (10) which drives the opening of the main valve (9) and is in turn controlled by the actuating valve (11).

11. An apparatus as claimed in claim 10, wherein said main valve (9) comprises a first movable obturator (12) actuated by means of a pressurize-able first chamber (13),
   wherein said first obturator (12) is in a closed position when said first chamber (13) is pressurized and goes to an open position when the first chamber (13) is depressurized, and wherein said control valve (10) is configured to cause the depressurization of the first chamber (13) when said control valve (10) is opened.

12. An apparatus as claimed in claim 11, further comprising a pressurization circuit (20) for pressurizing said tank (2) and said first chamber (13), wherein the tank (2) and said first chamber (13) being in fluid communication with one another.

13. An apparatus as claimed in claim 10, wherein said control valve (10) comprises a second movable obturator (14) actuated by means of a second pressurize-able chamber (15), said second obturator (14) is in a closed position when said second chamber (15) is pressurized and goes to an open position when the second chamber (15) is depressurized, and wherein said actuating valve (11) is configured to cause the depressurization of the second chamber (15) when said actuating valve (11) is opened.

14. An apparatus as claimed in claim 13, further comprising a pressurization circuit (20) for pressurizing said tank (2) and the second chamber (15), wherein the tank (2) and the second chamber (15) being in fluid communication with one another.

15. An apparatus as claimed in claim 9, wherein actuating valve (11) is a solenoid valve.

16. An apparatus as claimed in claim 9, wherein said actuating valve (11) is remotely controllable.

17. An apparatus as claimed in claim 9, wherein said actuating valve (11) is a manual valve.

18. An apparatus as claimed in claim 9 further comprising two parallel actuating valves (11), said two parallel actuating valves (11) comprising a manually operated valve and a solenoid valve.

19. An apparatus as claimed in claim 1, further comprising a pressurization circuit (20) for pressurizing said tank (2).

20. An apparatus as claimed in claim 19, wherein said pressurization circuit (20) allows the automatically recharging of the tank (2) after each launch.

21. An apparatus as claimed claim 1, further comprises means (43) for varying the position of said seat (8) for the ball (4) to be launched in said launch tube (3).

22. An apparatus as claimed in claim 21, wherein said throttling means (37) and said means (43) for varying the position of the seat (8) for the ball (4) are operatively associated with one another to vary the position of the seat (8) according to regulation of the transfer of the fluid from tank (2) to the launch tube (3) and vice versa, according to a predetermined relationship.

23. An apparatus as claimed in claim 1, wherein when the ball (4) is in the seat (8), between the seat (8) for the ball (4) and the open end (7) a third chamber (45) is defined in which the fluid expands at the moment of the launch, and said exhaust duct (5) is connected to the launch tube (3) in correspondence with the seat (8) for the ball (4).

24. An apparatus as claimed in claim 1, wherein the tank (2) has a variable volume.

25. An apparatus as claimed in claim 1, further comprising means for enhancing launch precision (67).

26. An apparatus as claimed in claim 25, wherein said means enhancing launch precision (67) are constituted by an annular element (69) positioned at an appropriate distance from the open end (7) of the launch tube (3).

27. An apparatus as claimed in claim 26, wherein the annular element (69) has a slightly greater inner diameter than the inner diameter of the launch tube (3).

28. An apparatus as claimed in claim 1, further comprising launch noise reducing means (68).

29. An apparatus as claimed in claim 28, wherein the noise reducing means (68) are constituted by an annular chamber (71), of adequate volume, mounted coaxially to the launch tube (3), said annular chamber (71) having an inner slit (72) obtained in correspondence with the open end (7) of the launch tube (3), and a plurality of lateral slits (73).

30. An apparatus as claimed in claim 29, wherein a total passage section in said annular chamber (71) is not much smaller than the section of the launch tube (3).

31. An apparatus as claimed in claim 29 wherein the annular chamber (71) have inner surfaces which are coated with a sound absorbing material.

32. An apparatus as claimed in claim 1, wherein said fluid is air.

33. An apparatus as claimed in claim 1, further comprising a support structure which allows orientation of the launch tube (3) to be adjusted.

34. An apparatus as claimed in claim 1, further comprising a programmable electronic unit which enables automatic and remotely controlled operation of said apparatus.

35. An apparatus as claimed in claim 1, wherein the exhaust duct (5) has a smaller section than the launch tube (3).

* * * * *